United States Patent Office 3,108,217
Patented Oct. 22, 1963

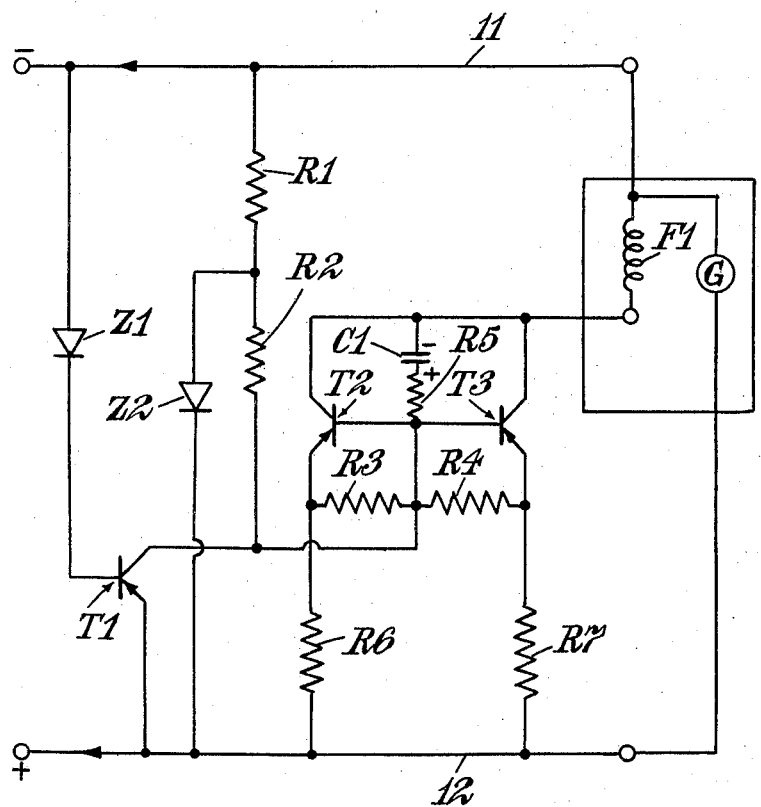

3,108,217
GENERATOR CONTROL SYSTEM
Edward Leyburn Robinson and Rodney Haydn Shimwell, East Finchley, London, England, assignors to Simms Motor Units Limited, London, England, a British company
Filed Sept. 7, 1960, Ser. No. 54,496
Claims priority, application Great Britain Sept. 8, 1959
4 Claims. (Cl. 322—28)

The invention relates to electric supply systems and is more particularly concerned with such systems employing variable speed generators, e.g. in or for, motor vehicles, aircraft or other craft.

The invention provides an electrical system comprising an electric generator having a field winding, a transistor or other semi-conducting device having three electrodes, between two of which (e.g. the emitter and collector) a controlled current path can be established and between the third of which, and one of the said two electrodes (e.g. the base and emitter), a control current path can be established, which device is connected to the field winding so that a current flowing through the controlled current path of the device also flows through the field winding and is connected to the generator output so that a current derived from the generator output can flow through the control current path, and a by-pass circuit including a semi-conducting diode or other device which becomes conductive when a voltage in excess of a predetermined value is applied to it, which by-pass circuit is connected in parallel with the control current path whereby, in use of the system, when the output of the generator reaches a value such that the said predetermined voltage is applied to the semi-conducting device, that device becomes conductive and current is diverted from the control current path to flow through the by-pass circuit.

Preferably two resistors are connected in series between the third electrode of the device and an output terminal of the generator, and the said by-pass circuit is connected between the junction of those resistors and the said one electrode of the semi-conducting device.

Preferably the system includes a second semi-conducting diode or other device which becomes conductive when a voltage in excess of a predetermined value is applied to it, to which device a voltage is applied in accordance with the output of the generator and which controls a voltage to be applied to the third electrode of the transistor or other semi-conducting device so as to vary the resistance of the controlled current path of that device in response to variations increasing the output of the generator in such a way as to reduce the output of the generator and thereby maintain the output of the generator substantially constant.

Preferably the first said semi-conducting device becomes conducting when the voltage of the generator output is substantially lower than that of the voltage of the generator output at which the second semi-conducting device becomes conducting.

One specific construction of apparatus embodying the invention will now be described by way of example with reference to the accompanying drawing which is a circuit diagram of the apparatus.

In this example the apparatus is embodied in a vehicle having a D.C. generator and maintains the output of the generator substantially constant after the output voltage has built-up to a predetermined maximum value. The output terminals of the generator G, which has a field winding F1, are connected to lines 11, 12, the line 11 being the negative line. The field winding F1 is connected to the positive line 12 through two parallel series circuits comprising power transistors T2, T3 and resistors R6, R7. The bases of transistors T2, T3 are connected together and to the collector of a control transistor T1, resistors R3, R4, R5 and capacitor C1 being connected as shown.

The base of transistor T1 is connected to the negative line 11 through a zener diode Z1. The collector of transistor T1 is connected to the negative line through series resistors R1, R2 and the junction of those resistors is connected to the positive line 12 through a power zener diode Z2.

In this example the controlled current path is provided by the parallel paths between the emitters and collectors of the transistors T2, T3, the control current path is provided by the parallel paths between the bases and emitters of those transistors and the by-pass circuit comprises the zener diode Z2.

Consider now that the engine of the vehicle is being started. Initially the transistors T1, T2, T3 will be in a non-conducting condition and there will be no current through the field winding F1. However due to the residual magnetism of the generator a small E.M.F. will be induced in the armature and this will cause currents to flow through the parallel circuits comprising resistors R6, R3, and R7, R4 and to the negative line 11 through the series resistors R2, R1. The passage of these currents through resistors R3, R4 will produce a potential difference between the emitters and the bases of the transistors T2, T3 so that the bases are negative with respect to the emitter. Consequently, the two transistors T2, T3 are rendered conducting and generator self-energising current flows through the field winding F1 and the controlled current paths of the parallel transistors T2, T3.

The passage of the energising current through the field winding F1 increases the output of the generator which increases the current flowing through the emitter/base circuits or control current paths of the transistors T2, T3. The transistors T2, T3 would have to be of an undesirably high rating if the current flowing in the resistor R1 due to the predetermined maximum value of the output voltage of the generator had to flow through the control current paths of the transistors T2, T3. The current by-pass path is therefore provided through the zener diode Z2 whereby generator current can be diverted from passing through the control current paths of the transistors T2, T3, before it has reached a value liable to damage the transistors T2, T3.

The zener diode Z2 is such that it conducts in the inverse direction when the voltage applied across it due to the output of the generator is about 8 volts. As the output of the generator rises to the output at which the zener diode Z2 becomes conducting, the current in the base/emitter circuits or control current paths of the transistors T2, T3 increases and consequently the energising current through the field winding F1 also increases. In this particular example, the zener diode Z2 becomes conducting when the generator is rotating at about 1,000 r.p.m.

When the generator output reaches the value at which the zener diode Z2 becomes conducting, a portion of the output current of the generator flowing through the resistor R1 will flow through the emitter-base circuits of the transistors T2, T3 and the remaining portion of that current will flow through the zener diode Z2 by-pass path. Consequently, when the zener diode Z2 becomes conducting the rise of emitter-base currents of the transistors T2, T3 will abruptly decrease. This effect however limits the maximum value that the energising current in the field winding F1 can attain.

After the zener diode Z2 has become conducting and the current by-pass path established, the output of the generator continues to increase as the engine speed increases until the voltage applied across the primary zener diode Z1 causes that diode to conduct in the inverse direction. When this occurs a negative potential is applied to the base of transistor T1 which is then brought to a conducting state. When transistor T1 becomes conducting a low resistance path is provided from the positive line 12 to the bases of transistors T2, T3 causing those transistors to be brought to a non-conducting condition. The energising current through the field winding F1 is thereupon interrupted or substantially decreased, and the output of the generator reduced.

The output of the generator continues to fall until the voltage applied to the zener diode Z1 is insufficient to cause that diode to conduct and the transistor T1 is returned to a non-conducting condition. When this occurs, the transistors T2, T3 are returned to a conducting condition causing current to flow through the field winding F1 or causing that current to increase. The output of the generator again increases until zener diode Z1 conducts and the energising current in the field winding F1 is again interrupted or substantially decreased. The output of the generator is thereby maintained substantially constant at the output voltage at which the zener diode Z1 becomes conducting.

In the foregoing example the various electrical components have the following values or identifications:

Resistors—
R1 _____ ohms__ 200
R2 _____ do____ 220
R3 _____ do____ 68
R4 _____ do____ 68
R5 _____ do____ 68
R6 _____ do____ 1
R7 _____ do____ 1

Capacitors—
C1 _____ microfarads__ 200

Transistors—
T1 _____ Type OC 72.
T2 _____ Type OC 28.
T3 _____ Type OC 28.

Zener diodes—
Z1 _____ Intermetal type Z6, Z7 or Z8.
Z2 _____ Type ZL8.

The invention is not restricted to the details of the foregoing example. For instance, the circuit components may have other suitable values or identifications. Other types of transistors may be employed.

We claim:

1. An electrical system comprising a generator having a field winding, means for controlling current in the field winding comprising a controlled current path in series with the field winding and connected to the generator to derive current therefrom, a control current path for controlling current in the said controlled current path, a potential divider connected across the generator output, the said control current path being connected across a part of the potential divider to derive current therefrom, a first device which becomes conductive when a voltage greater than a predetermined first value is applied to it, the said first device being connected to the generator so that a voltage in accordance with the voltage output of the generator is applied to it, means responsive to the said first device becoming conductive to cut off current in the said control current path and thereby to cut off current in the controlled current path and the field winding, whereby the generator output voltage is prevented from rising above a value corresponding to the said first value, and a by-pass circuit includeng a second device which becomes conductive when a voltage greater than a predetermined second value less than the said first value is applied to it, the said by-pass circuit being connected across at least as great a part including the aforesaid part of the potential divider as the said control current path, whereby current in the said control current path is reduced to a value substantially independent of variations in generator output voltage between values corresponding to the said second and first values.

2. An electrical system as claimed in claim 1, in which the said first and second devices comprise zener diodes.

3. An electrical system comprising a generator having a field winding, at least one power transistor having a controlled current path and a control current path for controlling current in the said controlled current path which is in series with the field winding and is connected to the generator to derive current therefrom, a potential divider connected across the geenrator output, the said control current path being connected across a part of the potential divider to derive current therefrom, a first zener diode which becomes conductive when a voltage in excess of a predetermined first value is applied to it, the said first zener diode being connected to the generator so that a voltage in accordance with the output of the generator is applied to it, a control transistor having three electrodes, one of the said three electrodes being connected to the said first zener diode and the other two of the said three electrodes being connected at opposite ends of the said control current path, whereby when the said first zener diode becomes conductive a low impedance current path is provided across the said control current path thereby to render the said power transistor non-conducting and prevent the generator output voltage from rising above a value corresponding to the said first value, a second zener diode which becomes conductive when a voltage in excess of a predetermined second value less than the said first value is applied to it, the said second zener diode being connected across at least as great a part including the aforesaid part of the potential divider as the said control current path, whereby current in the said control current path is reduced to a value substantially independent of variations in generator output voltage between values corresponding to the said second and first values.

4. An electrical system as claimed in claim 3, in which the said controlled current path comprises the emitter-collector circuit of the said power transistor and the said control current path comprises the emitter-base circuit of the said power transistor.

References Cited in the file of this patent
UNITED STATES PATENTS
2,945,174    Hetzler _____ July 12, 1960
2,976,473    Shaw et al. _____ Mar. 21, 1961